United States Patent [19]

Shapiro et al.

[11] 3,855,054

[45] Dec. 17, 1974

[54] SULFUR ADHESIVE FOR WOOD LAMINATE

[75] Inventors: Hymin Shapiro; Albert P. Giraitis; Robert N. Sanders, all of Baton Rouge, La.

[73] Assignee: Ethyl Corporation, Richmond, Va.

[22] Filed: July 5, 1972

[21] Appl. No.: 269,198

[52] U.S. Cl............... 161/182, 161/226, 161/270, 423/567
[51] Int. Cl.................. B32b 21/04, B32b 9/04
[58] Field of Search................ 161/182, 226, 270; 423/567

[56] References Cited
UNITED STATES PATENTS

| | | | |
|---|---|---|---|
| 1,741,522 | 12/1929 | Kobbe | 156/325 |
| 804,850 | 11/1905 | Ireson | 161/226 |
| 1,537,752 | 5/1925 | Coyne | 156/325 |
| 2,367,629 | 1/1945 | Teppema et al. | 161/226 |
| 2,932,622 | 4/1960 | Bloch | 161/182 |

Primary Examiner—George F. Lesmes
Assistant Examiner—William R. Dixon, Jr.
Attorney, Agent, or Firm—D. L. Johnson; J. F. Sieberth; E. E. Spielman, Jr.

[57] ABSTRACT

A process for bonding together wood adherends, animal skin adherends or combinations thereof with a molten sulfur adhesive is disclosed. An article comprising wood or animal skin adherends or both bonded together with solidified sulfur is also disclosed.

4 Claims, No Drawings

SULFUR ADHESIVE FOR WOOD LAMINATE

BACKGROUND OF THE INVENTION

The utilization of adhesives in the bonding of wood or animal skins finds its origin in the very early history of man. The first adhesives for bonding such articles were those which naturally occurred in nature, e.g., glue from animal protein by products, vegetable starch, caseins, soybeans, blood, blood-albumin and the like. Efficacious as these adhesives may be—indeed some are still used today—these naturally occurring adhesives do not always provide adhesion that will meet present day specifications. This is especially ture in the wood industry where bond strength and resistance to erosion of bond strength in the presence of moisture is of primary concern. The wood industry has found it necessary to turn to the newer so-called chemically active type adhesives, e.g., urea formaldehyde resin, phenol-formaldehyde resin, etc. These chemically reactive resins are characterized by the fact that the adhesive undergoes a chemical reaction in the actual bonding process. With these adhesives, generally speaking, a monomer or low-molecular-weight polymer is mixed with a catalyst or an initiator, or in some cases additional reactants prior to being spread in liquid form upon the adherend surface to be bonded. The other adherend surface to be bonded is applied to the bond surface of the first adherend, pressure is applied and the adhesive is allowed to "cure." The "curing" is the period of time which is required for the chemical reaction to go to essential completion thus effecting adhesion between the two adherend bond surfaces. Unfortunately, these chemically reactive type adhesives are not without serious shortcomings as they, for the most part, have very short shelf lives and liquid pot lives as the chemical reaction is always proceding at a rate dependent upon the temperature at which the adhesive is kept. Another disadvantage, and this is especially true in the plywood industry, is that chemically reactive adhesives have relatively long "curing" times and thus a bottleneck occurs in the continuous plywood making process. This latter shortcoming is well recognized by the plywood industry. See for example, Kirk-Othmer Encyclopedia of Chemical Technology, Second Edition, Volume 15, pages 896–907, the contents of which are incorporated herein as if fully set forth.

Thus it is an object of this invention to provide a process for the bonding of two adherend bond surfaces together with an adhesive which has high bond strength, high resistance to moisture and has relatively short "curing" time. It is also an object of this invention to provide a bonded article which has high bond strength and resistance to erosion of bond strength by contact with moisture.

DESCRIPTION OF THE INVENTION

This invention relates in part to a process for adhesively bonding at least a portion of an adherend surface to at least a portion of another adherend surface, the adherend surfaces being wood or animal skin or both which comprises establishing adhesive contact between the adherend surfaces to be bonded and a molten sulfur adhesive and maintaining the contact until the adhesive has solidified. Another embodiment of this invention is an article of manufacture in which at least a portion of an adherend surface is bonded to at least a portion of another adherend surface by means of a solidified sulfur adhesive, the adherend surfaces bonded being of wood or animal skin or both.

Exemplary of the wood adherend surfaces which may be utilized for the purposes of this invention are soft woods such as Douglas fir, southern pine, hemlock, western red cedar, Noble fir, white fir, redwood, spruce, and hard woods such as birch, maple, cherry, walnut, oak, poplar, gum, basswood, mahogany, lauan, beech, ash, hickory, elm, sycamore, linden, chestnut, etc. The animal skin adherend surfaces may be various animal hides such as the hides of bovine, swine, beaver, seal, mink, deer, alligator, lizard, rabbit, etc.

The molten sulfur utilized as an adhesive for the purpose of this invention may be elemental sulfurs or commercial purity in amphoteric forms or any crystallin form.

The molten adhesive may contain various additives such as fillers, plasticizers, pigments and the like. Exemplary of fillers which may be utilized with the adhesive of this invention are wood flour, sawdust, fine sand, fly ash, various fine inert clays, etc. The fillers may be present in an amount up to about 60 weight percent. Fillers having a high heat capacity such as metallic filings, metallic wools or powders, etc. may be used to act as flame retardants. Chemical flame retardants such as halogenated compounds may also be added. The plasticizers which may be used to render the adhesive of this invention more plastic are polyethylene tetrasulfide, polydiacetic tetrasulfide, dimercaptobutane, diallyl tetrasulfide, (mercaptoethylene) cyclohexanethiols and the like. The plasticizers may be present in amounts ranging up to about 25 weight percent. To give color to the adhesive pigments such as iron oxide, calcium chromate, barium chromate, etc. may be present in amounts up to above 25 weight percent. The additives may be used singularly or in combination.

The temperature of the molten sulfur adhesive should be in excess of the melting point of sulfur, i.e., about 112°C but not in great excess of about 200°C. A preferred temperature range is from about 120°C to about 160°C as within this range the adhesive is sufficiently hot to insure a sufficient time to contact the surfaces to be bonded before solidification of the sulfur but not so high as to produce substantial formation of polymerized material. Should polymerized material form, it is preferred that this material be filtered from the adhesive prior to application of the bond surfaces.

Extension of the solidification time of the molten sulfur may be accomplished by heating, prior to application of the molten sulfur, the wood or animal skin surfaces to be bonded up to a temperature just below which unacceptable thermal damages occur. Conventional methods of heating may be used. Heating by oven or hot roller is most preferred as these means are inexpensive.

Establishing adhesive contact between the adherend surfaces to be bonded and the molten sulfur adhesive can be accomplished by any number of ways. For example adhesive contact can be achieved by physically bringing the adherends surfaces to be bonded together after the molten adhesive has been applied to one or both bond surfaces. Another method for establishing adhesive contact is to maintain the surfaces to be bonded a desired distance apart, e.g., 1 inch, and pouring or injecting the molten sulfur adhesive into the resultant space. A yet further method is to form the molten sulfur in situ, i.e., the solid sulfur is placed on either one or both of the adherend surfaces to be bonded and then subsequently heated alone or along with the surfaces to be bonded until the sulfur is rendered molten. The adherend surfaces to be bonded need not comprise the entirety of the adherend surface(s) but may be only a portion thereof. For highest bond strength it is desirable to have an adherend surface to be bonded which has the largest possible surface.

Maintenance of the adhesive contact until the molten sulfur has solidified is preferably accomplished by applying a pressure to the adherend surfaces to be bonded. By applying pressure entrapped air will be evacuated and the molten adhesive will fill any surface irregularities which will insure better adhesive-adherend bond surface contact. Pressures from about 0.1 psi up to about 700 psi or greater may be utilized. However, care should be taken to not exceed that pressure which will have a destructive effect on the adherends. For example in the plywood industry where thin wood veneers are utilized as the wood adherend(s) pressures on the order of from about 25 psi to about 90 psi are sufficient. Pressure can be applied on the bond surface by either loading the aherends with weight, passing the adherends between rollers or by clamping or pressing the adherend bond surfaces together with various screw or hydraulic clamps or presses. Other means for maintaining pressure on the adherends for the purposes of this invention are well known to those skilled in the art.

The contact as before said is to be maintained until the molten sulfur adhesive of this invention has substantially solidified. The period of time required for such solidification will be dependent upon the cooling temperature, available heat sinks, the heat transfer coefficient for the adherends and the number of adherends bonded together. For example the solidification time for bonding two pieces of ½ inch fir plywood each having a bond surface area of 0.1 square foot is from about ½ to about 1-½ minutes. Bonding two pieces of ¼ inch bovine leather having a contact surface of 0.1 square foot takes approximately ½ to 1 minute. The above solodification times were achieved at room temperature with the utilization of a standard hydraulic press having 8 inch ×8 inch metal faces to maintain the bond contact. With adherends of the above recited size such a press acts as an infinite heat sink. For samples of larger sizes, of course, to obtain the effects of an infinite heat sink a larger press would be required.

Application of the molten adhesive to the adherend surfaces to be bonded can be achieved by any one of the numerous means for application of adhesives to adherends known to those skilled in the art, e.g., pouring, brushing, spraying, dipping, rolling, etc. Since the adhesive of this invention is in molten form, application of the adhesive by hot roller or by knife is a most preferred bode of application. As mentioned previously the molten sulfur adhesive can be produced in situ by placing solid sulfur on one or both bond surfaces and then subsequently heating the sulfur to a molten state. When this mode is used, application of the solid sulfur can be achieved by pouring, sprinkling, blowing with air, etc., the solid sulfur onto the surfaces. Application of the molten adhesive may be to either one or both of the adherend surfaces to be bonded. If only one adherend surface to be bonded has adhesive applied to it, the required adhesive contact of the molten sulfur with the second adherend surface to be bonded will be accomplished upon bringing the two bond surfaces together.

To achieve the highest bond strength the preferred minimum amount of adhesive to be applied will be that amount which is sufficient to substantially cover both of the adherend surfaces to be bonded upon contact of these surfaces and the molten adhesive. Coverage of at least a portion of the adherend surfaces which are exclusive of the bond surfaces is permissible and in some instances may be preferable for decorative purposes, weatherproofing purposes, protective purposes, sealing purposes, etc. For example, it may be desirable for sealing purposes to completely cover all surfaces of the adherends even though the bond surfaces between the adherends will not comprise the totality of the adhesive-covered surfaces.

The process of this invention has many and valuable applications. For example, if the adherends are wood, the process of this invention may be utilized to produce plywood, to apply wood veneers on wood surfaces, to form structural wood products such as chairs, desks, etc., to repair broken wood objects and the like.

If the adherend surfaces to be bonded are animal hides, the process of this invention is quite useful in the manufacture of shoes, purses, decorative leather chains, or other related products.

It may be desirable for decorative purposes to bond wood adherends to animal skin adherends. For example, it may be desirable to bond the hide of a deer to a wood adherend using the resultant product as a decorative piece or the like. Thus it is within the scope of this invention that both adherends surfaces to be bonded need not both be of wood or of animal skin but rather that one adherend surface to be bonded can be wood with the other being of animal skin.

Not only does the process of this invention provide the useful articles of manufacture and related products mentioned above but also the instant process has the advantage over present day processes in that only a relatively short period of time is required for the adhesive to bond the adherends by solidification.

It is to be understood that the processes of this invention can be utilized to manufacture a bonded product containing more than just two adherend bond surfaces. This is best illustrated by utilization of the instant process for the manufacture of plywood wherein at least three adherend bond surfaces are involved, the two exterior adherends being of a wood which is esthetically pleasing and the interior adherend being of a wood which is of minimum esthetic value. Of course, if thicker plywood is desired, additional wood adherends may be utilized to suit the particular need.

The following non limiting examples further illustrate the process and products of this invention.

EXAMPLE I

Molten sulfur at a temperature of about 130°C was applied to a face bond surface on each of two ½ inch fir plywood adherends measuring approximately 2 inches × 6 inches per face. The faces upon which the molten sulfur was applied were brought into contact at a pressure of about 300 psi which was applied by means of a conventional hydraulic press. After maintaining the contact under the above pressure for 5 minutes the bonded adherends were removed therefrom. Upon mechanically separating the two adherends, it was observed that wood fibers were torn from the wood adherend at the wood-solidified sulfur interface thus indicating a highly effective adhesive bond.

EXAMPLE II

The procedure of Example I was repeated except that the plywood was outdoor plywood, the two adherends measured 1-½ inches × 1-½ inches per face and the pressure was increased to 700 psi. Instead of mechanically separating the two adherends immediately after removing them from the press, the bonded adherends were submerged in water maintained at ambient temperature for 31 days. The bonded adherends were then removed and mechanically separated. It was observed upon separation that wood fibers were torn at the wood-solidified sulfur interface thus indicating a highly effective water-resistant bond.

EXAMPLE III

Molten sulfur at a temperature of about 120°C was applied to a face bond surface on each of two ¼ inch bovine leather adherends measuring approximately 1-½ inches × 6 inches per face. The faces upon which the molten sulfur was applied were brought into contact at a pressure of about 300 psi which was applied by means of a conventional hydraulic press. After maintaining the contact at the above pressure for 5 minutes the bonded adherends were removed therefrom. Upon mechanically separating the two adherends it was observed that leather fibers were torn from the leather adherends at the leather-solidified sulfur interface thus indicating a highly effective adhesive bond.

We claim:

1. An article of manufacture in which at least a portion of an adherend surface is bonded to at least a portion of another adherend surface by means of a solidified sulfur adhesive, the bonded surfaces being of wood and the solidified sulfur containing up to about 25 percent by weight of a plasticizer selected from the group consisting of polyethylene tetrasulfide, polydiacetic tetrasulfide, di-mercaptobutane, diallyl tetrasulfide, mercaptoethylene and cyclohexanethiols.

2. The article of claim 1 wherein the solidified sulfur additionally contains up to about 60 percent by weight of a filler selected from the group consisting of wood flour, sawdust, fine sand, flyash, inert clays and metallic filings, wools or powders.

3. The article of claim 1 wherein the solidified sulfur additionally contains up to about 25 percent by weight of a pigment selected from the group consisting of iron oxide, calcium chromate and barium chromate.

4. The article of claim 1 wherein the solidified sulfur additionally contains,
a. up to about 60 percent by weight of a filler consisting of wood flour, sawdust, fine sand, flyash, inert clays and metallic filings, wools or powders; and
b. up to about 25 percent by weight of a pigment selected from the group consisting of iron oxide, calcium chromate and barium chromate.

* * * * *